(12) United States Patent
Ziaylek et al.

(10) Patent No.: US 9,388,029 B2
(45) Date of Patent: Jul. 12, 2016

(54) TANK HANDLING APPARATUS FOR USE LIFTING, SUPPORTING AND MANIPULATING CYLINDRICAL TANKS

(71) Applicant: Michael P. Ziaylek, Yardley, PA (US)

(72) Inventors: Michael P. Ziaylek, Yardley, PA (US); W. Brian McGinty, Huntingdon Valley, PA (US)

(73) Assignee: Michael P. Ziaylek, Yardley, PA (US)

( * ) Notice: Subject to any disclaimer, the term of this patent is extended or adjusted under 35 U.S.C. 154(b) by 29 days.

(21) Appl. No.: 14/121,436

(22) Filed: Sep. 5, 2014

(65) Prior Publication Data

US 2015/0329337 A1 Nov. 19, 2015

Related U.S. Application Data

(60) Provisional application No. 61/996,643, filed on May 13, 2014.

(51) Int. Cl.
| | |
|---|---|
| *B66F 9/18* | (2006.01) |
| *B66F 9/075* | (2006.01) |
| *B65G 7/00* | (2006.01) |
| *B66F 9/065* | (2006.01) |
| *B66F 9/12* | (2006.01) |

(52) U.S. Cl.
CPC ... *B66F 9/18* (2013.01); *B65G 7/00* (2013.01); *B66F 9/065* (2013.01); *B66F 9/07504* (2013.01); *B66F 9/125* (2013.01)

(58) Field of Classification Search
CPC ........ B66F 9/07559; B66F 9/125; B66F 9/14; B66F 9/149; B66F 9/065; B66F 9/186; B66F 9/187; B66F 9/06; B65G 7/00; B65G 65/23; B65G 65/24; B62B 1/14; B62B 1/264; B62B 1/142; B62B 2202/022; B62B 2203/44; B62B 2203/10; B62B 3/0631
See application file for complete search history.

(56) References Cited

U.S. PATENT DOCUMENTS

| | | | | |
|---|---|---|---|---|
| 1,397,719 | A | * | 11/1921 | Bryan ............................ 414/452 |
| 1,551,928 | A | * | 9/1925 | Bryan ............................ 414/452 |
| 1,896,249 | A | | 2/1933 | Russell |
| 2,404,513 | A | | 7/1946 | McCabe |
| 2,624,483 | A | | 1/1953 | Ketzel |
| 2,738,086 | A | | 3/1956 | Reich |
| 3,235,212 | A | | 2/1966 | Baumiller, Jr. |
| 3,471,046 | A | | 10/1969 | Hess |
| 3,587,892 | A | | 6/1971 | Vermette |
| 3,602,368 | A | | 8/1971 | Gould |
| 3,858,736 | A | * | 1/1975 | French et al. ................. 414/633 |

(Continued)

*Primary Examiner* — Glenn Myers

(74) *Attorney, Agent, or Firm* — Fox Rothschild LLP

(57) ABSTRACT

A tank handling apparatus for facilitating movement of cylindrical tanks such as oxygen tanks as needed which includes a carriage assembly with a main upright member and a parallel swing arm assembly extending outwardly therefrom with multiple lifting arms with a tank retaining housing movably secured thereto which defines a zone therein for receiving of the cylindrical tank. The apparatus provides movement capability vertically upwardly and outwardly, as well as rotational movement of the tank retaining housing to facilitate changing orientation of the position of a different tank between a horizontally extending position and a vertically extending position. An automatic locking mechanism is included which is gravitationally powered for facilitating deployment of a foot support member beneath the tank receiving zone in all positions other than when the held tank is horizontally positioned.

18 Claims, 17 Drawing Sheets

(56) References Cited

U.S. PATENT DOCUMENTS

| | | |
|---|---|---|
| 4,021,070 A | 5/1977 | Shea |
| 4,395,188 A | 7/1983 | Kaup |
| 4,511,171 A | 4/1985 | Petersen |
| 4,536,123 A | 8/1985 | Snyder |
| 4,556,358 A | 12/1985 | Harlan |
| 4,615,656 A | 10/1986 | Geraghty, Jr. |
| 4,738,582 A | 4/1988 | Roberts |
| 4,797,050 A | 1/1989 | Habicht |
| 5,207,550 A | 5/1993 | Lehman |
| 5,340,136 A | 8/1994 | MacNeil et al. |
| 5,344,278 A | 9/1994 | Emig, Jr. |
| 5,393,190 A | 2/1995 | Vickary |
| 5,651,149 A | 7/1997 | Garman |
| 5,658,118 A | 8/1997 | Luca |
| 6,086,312 A | 7/2000 | Ziaylek et al. |
| 6,318,568 B1 | 11/2001 | McCord |
| 6,406,248 B1 | 6/2002 | McGill et al. |
| 6,637,999 B2 | 10/2003 | Grossele |
| 7,394,387 B2 | 7/2008 | Noonchester |
| 7,789,611 B2 | 9/2010 | Wilson |
| 7,824,144 B2 | 11/2010 | Wilson |
| 8,035,525 B2 | 10/2011 | Noonchester |
| 2002/0076313 A1 | 6/2002 | Vartanian, Sr. |
| 2007/0292249 A1 | 12/2007 | Wilson |
| 2010/0021275 A1* | 1/2010 | Ratermann ............ 414/454 |
| 2010/0263967 A1* | 10/2010 | Agoncillo et al. ......... 187/231 |

* cited by examiner

TANK HANDLING APPARATUS FOR USE LIFTING, SUPPORTING AND MANIPULATING CYLINDRICAL TANKS

The present utility application hereby formally claims priority of U.S. Provisional Patent application No. 61/996,643 filed May 13, 2014 on a "Tank Handling Apparatus For Use Lifting, Supporting and Manipulating Cylindrical Tanks" filed naming the same inventors as listed herein, namely, Michael P Ziaylek and W Brian McGinty, and assigned to the same assignee as listing herein, namely, Michael P Ziaylek, and said referenced provisional application is hereby formally incorporated by reference as an integral part of the present application.

BACKGROUND OF THE INVENTION

1. Field of the Invention

The present invention applies to the field of devices for in some manner holding, transporting or moving of cylindrical tanks such as gas tanks, and most particularly, oxygen tanks which are commonly utilized by emergency personnel such as with fire trucks and rescue trucks. Storage of large heavy cylindrical tanks of gas as required on such vehicles often are in racks that are horizontally oriented, therefore the need has arisen for handling of such cylindrical tanks to facilitate movement thereof vertically, as well as rotational movement thereof such that the tank can be positioned horizontally or vertically for deployment or storage as needed in the particular situation and as dictated by the requirements of the vehicle in which it is positioned.

2. Description of the Prior Art

Numerous patents have been granted on prior art devices for the purposes of lifting, supporting and/or manipulating cylindrical tank configurations such as shown in U.S. Pat. No. 1,896,249 patented Feb. 7, 1933 to F. B. Russell and assigned to Bethlehem Steel Company on a "Carrier"; and U.S. Pat. No. 2,404,513 patented Jul. 23, 1946 to B. L. McCabe and assigned to Stuart Oxygen Co. on a "Gas Cylinder Holder"; and U.S. Pat. No. 2,624,483 patented Jan. 6, 1953 to E. E. Ketzel on a "Carrier For Welding Outfits"; and U.S. Pat. No. 2,738,086 patented Mar. 13, 1956 to W. A. Reich and assigned to A. Reich & Sons, Inc. on a "Hand Truck For Handling Banana Bunches"; and U.S. Pat. No. 3,235,212 patented Feb. 15, 1966 to B. J. Baumiller, Jr. on a "Portable Laundry Basket"; and U.S. Pat. No. 3,471,046 patented Oct. 7, 1969 to G. H. Hess and assigned to Stanray Corporation on a "Cart For Gas Cylinders"; and U.S. Pat. No. 3,587,892 patented Jun. 28, 1971 to Howard H. Vermette on a "Device For Elevating, As Well As Tipping Or Tilting Drums, Barrels, Containers And The Like To Dump The Contents Therefrom"; and U.S. Pat. No. 3,602,368 patented Aug. 31, 1971 to Robert H. Gould and assigned to Sun Oil Company on a "Pallet For Gas Cylinders And The Like"; and U.S. Pat. No. 4,021,070 patented May 3, 1977 to Fran Joseph Shea on a "Mechanical Lift"; and U.S. Pat. No. 4,395,188 patented Jul. 26, 1983 to Otmar Kaup and assigned to Kaup & Co. KG on a "Load Carrying Arrangement For A Lift Truck"; and U.S. Pat. No. 4,511,171 patented Apr. 16, 1985 to Lee B. Petersen on a "Wheelchair Restraint"; and U.S. Pat. No. 4,536,123 patented Aug. 20, 1985 to Wayne E. Snyder on a "Hand Truck Apparatus for Elevating And Transporting An Object"; and U.S. Pat. No. 4,556,358 patented Dec. 3, 1985 to Burton C. Harlan on a "Portable Hoist"; and U.S. Pat. No. 4,615,656 patented Oct. 7, 1986 to Joseph T. Geraghty, Jr. on a "Cylinder Gripping Attachment For A Fork Lift Truck; and U.S. Pat. No. 4,738,582 patented Apr. 19, 1988 to John E. Roberts and assigned to E. Manufacturing Company Inc. on a "Tank Carrier and Manipulator"; and U.S. Pat. No. 4,797,050 patented Jan. 10, 1989 to Helmut Habicht on an "Apparatus for Lifting and Tilting Drums Of Flowable Material"; and U.S. Pat. No. 5,207,550 patented May 4, 1993 to Marcus S. Lehman and assigned to Valley Craft on a "Drum Handler"; and U.S. Pat. No. 5,340,136 patented Aug. 23, 1994 to Ralph M. MacNeil et al and assigned to Canadian Liquid Air Ltd. on a "Cylinder Cart With Magnetics"; and U.S. Pat. No. 5,344,278 patented Sep. 6, 1994 to Howard Emig, Jr. on an "Apparatus for Raising And Moving An Open Ended Container"; and U.S. Pat. No. 5,393,190 patented Feb. 28, 1995 to Coleman Vickary on an "Apparatus For Lifting And Tilting Heavy Containers"; and U.S. Pat. No. 5,651,149 patented Jul. 29, 1997 to David Edmund Talbot Garman and assigned to Mangar International Limited on an "Apparatus For Moving Disabled Persons"; and U.S. Pat. No. 5,658,118 patented Aug. 19, 1997 to Battista Luca on a "Cylinder Transporter"; and U.S. Pat. No. 6,086,312 patented Jul. 11, 2000 to Michael P. Ziaylek et al on a "Tank Handling Apparatus"; and U.S. Pat. No. 6,318,568 patented Nov. 20, 2001 to Anthony McCord and assigned to L'Air Liquide Societe Anonyme pour l'Etude et l'Exploitation des Procedes Georges Claude on "Installation For Storing and Holding Gas Cylinders"; and U.S. Pat. No. 6,406,248 patented Jun. 18, 2002 to Dennis E. McGill et al on an "Apparatus For Lifting And Moving An Upright Cylindrical Container"; and U.S. Pat. No. 6,637,999 patented Oct. 28, 2003 to Massimo Grossele and assigned to Gromet s.n.c. di Grossel Massimo & C. on an "Ecological Carriage For Dums"; and U.S. Pat. No. 7,394,387 patented Jul. 1, 2008 to Joseph W. Noonchester on an "Emergency Worker Rescue Apparatus"; and U.S. Pat. No. 7,789,611 patented Sep. 7, 2010 to Michael Wilson and assigned to Wilcole, Inc. on a "Compact System For Lifting And Moving A Pressurized Tank; and U.S. Pat. No. 7,824,144 patented Nov. 2, 2010 to Michael R. Wilson and assigned to Wicole, Inc. on a "Compact System For Lifting And Moving A Pressurized Tank"; and U.S. Pat. No. 8,035,525 patented Oct. 11, 2011 to Joseph W. Noonchester on an "Emergency Worker Rescue Apparatus"; and United States Patent Publication No. 2002/0076313 published Jun. 20, 2002 to Roger Vartanian SR on a "Platform Lift"; and United States Patent Publication No. 2007/0292249 published Dec. 20, 2007 to Michael Wilson on a "Compact System For Lifting And Moving Pressurized Tank".

SUMMARY OF THE INVENTION

The apparatus of the present invention is designed for the purpose of handling tanks such as lifting, supporting or otherwise manipulating of tanks, particularly cylindrical tanks and more particularly cylindrical gas tanks which are commonly used to hold various types of gases such as oxygen and the like. The use of such tanks with emergency vehicles such as fire trucks and rescue trucks is commonplace. Such tanks are extremely heavy and because they are utilized to resupply oxygen to the individual smaller tank which are part of the equipment of every fire fighter or rescue worker.

The cylindrical tanks with which the apparatus of the present invention is usable preferably includes an upper tank section which normally has a valve or access apparatus near the upper portion of the tank, and a lower tank section including a bottom of the tank which needs to be supported during handling by the tank handling apparatus to assure firm retaining thereof during manipulating. For this purpose the apparatus includes a carriage assembly with a transport frame and a main upright member secured to the transport frame and extending upwardly therefrom.

A parallel swing arm assembly is included which is pivotally mounted with respect to the main upright member of the carriage assembly and extends outwardly therefrom. The parallel swing arm assembly will preferably include a supporting end pivotally attached with respect to the main upright member of the carriage assembly and a tank end which is spatially disposed from this supporting end.

A drive mechanism is included which is longitudinally extensible and longitudinally retractable and is attached to the carriage assembly and to the swing arm assembly to facilitate movement thereof between a lifted position and a lower position. The lifted position will be achieved responsive to extended movement of the drive and the lower position therebelow and closer to the main upright member will be achieved responsive to retracted movement of the drive.

A front rail assembly is included having a face plate which is pivotally attached to tank end of the parallel swing arm assembly and is movable therewith. This face plate will define a support surface thereon which is oriented facing outwardly away from the main upright member. The front rail assembly further includes a main shaft extending outwardly from the face plate.

The apparatus of the present invention further includes a tank retaining housing which is pivotally movably secured with respect to the face plate of the parallel swing arm assembly such as to be rotatable with respect thereto through a plane oriented extending approximately parallel with respect to the support surface. This tank retaining housing would also define a tank receiving zone therewithin which is adapted to selectively receive and retain a cylindrical tank therein as needed.

The tank retaining housing will preferably include an upper housing section to retain the upper portion of a cylindrical tank responsive to positioning of the cylindrical tank within the tank receiving zone. The tank retaining housing will also include a lower housing section for retaining the lower portion of a tank therein responsive to positioning of the cylindrical tank within the tank receiving zone. A securement mechanism is included for selectively retaining and holding of a cylindrical tank within the tank receiving zone with the lower portion thereof positioned within the lower housing section, and with the upper portion thereof positioned within the upper housing section.

Such cylindrical tanks retained by the apparatus of the present invention are commonly extremely heavy and support from beneath the bottom of the tank is an important consideration. For this purpose, the present invention will include a supporting member which is movably mounted with respect to the lower section of the tank retaining housing and can be moved to a supporting foot position or a retracted foot position. The retracted foot position of the foot supporting member locates the member spatially disposed from a cylindrical tank position within the tank receiving zone. However, when the foot supporting member is moved to the supporting foot position, it will be located adjacent to the lower tank section of a cylindrical tank position within the tank receiving zone in such a manner as to facilitate supporting of the lower section thereof responsive to positioning of the cylindrical tank within the tank receiving zone with the lower tank section thereof positioned within the lower housing section. Preferably the foot supporting member is resiliently biased at all times such that it is continuously being urged to move toward the foot supporting position.

The apparatus may further include a deployment handle mechanism mounted with respect to the tank retaining housing which is operatively attached with respect to the foot supporting member. In this manner, activation of the deployment handle will apply a force on the foot supporting member in such a manner as to urge movement thereof to a retracted foot position. Operation of the deployment handle mechanism such as manual operation will overcome the resilient forces continuously urging the foot supporting member toward the supporting foot position, and when so overpowered, operation of the deployment handle mechanism will achieve movement of the foot supporting member to the retracted foot position.

The apparatus of the present invention further includes a foot locking mechanism movably mounted with respect to the tank retaining housing which includes a locking lug which is pivotally mounted with respect to the lower housing section of the tank retaining housing at a position adjacent to the foot supporting member. This locking lug is movable to a lug locking position to selectively hold the foot supporting member in the supporting foot position responsive to rotational movement of the tank retaining housing to a position wherein the cylindrical tank is oriented extending generally vertically. The locking lug is also movable to a lug unlocking position to selectively allow movement of the foot supporting member away from the foot supporting position and toward a retracted foot position by operation of the deployment handle. This movement will be responsive to rotational movement of a tank retaining housing to a position wherein the cylindrical tank is oriented extending generally horizontally. Movement of the locking lug of the foot locking mechanism between the lug locking position and the lug unlocking position is powered solely by the exertion of gravitational force thereon responsive to movement of the tank retaining housing with the cylindrical tank positioned therein between a generally horizontally extending position and a generally vertically extending position. As such, there is no interacting linkage which cooperates in order to control deployment of the foot supporting member. This is a unique advantage over prior art devices which require interconnecting linkage to monitor the particular orientation of the cylindrical tank at all given moments, and in this manner, lock the foot supporting member based on the orientation of the cylindrical tank responsive to positioning of linkage secured with respect to the parts which move in order to position the tank holding mechanism between the tank horizontally extending position and the tank vertically extending position.

As such, this foot locking mechanism has a unique advancement over the prior art. The foot locking mechanism can include a locking abutment surface thereon which is positionable in abutment with respect to the lower housing section of a tank retaining housing responsive to movement of the locking lug of the foot locking mechanism into the lug locking position. Furthermore, the foot locking mechanism can include a weighted locking section which enhances the exertion of gravitational forces on the foot locking mechanism to further facilitate movement of the locking lug between the lug locking position and the lug unlocking position. The construction of the deployment handle mechanism can include a deployment itself further removably attached with respect to the tank retaining housing and a handle drive shaft rotatably mounted with respect to a tank retaining housing and extending from a position adjacent the deployment handle to a position adjacent the foot supporting member. Preferably, the handle drive shaft is operatively attached to the foot supporting member and to the deployment handle to facilitate the applying of force on the foot supporting member to enhance the urging of movement thereof toward the retracted foot position responsive to operation of the deployment handle.

It is an object of the tank handling apparatus of the present invention to provide a means for lifting, supporting and manipulating a cylindrical tank such as oxygen tanks which tanks often include an upper tank section having a valve apparatus secured to the upper portion thereof and a lower tank section with a tank bottom at the lowermost portion thereof.

It is an object of the tank handling apparatus of the present invention to provide a means for lifting, supporting and manipulating of a cylindrical tank such as oxygen tanks which includes a parallel swing arm assembly pivotally mounted with respect to a carriage to move a retaining tank vertically between a lifted position and a lowered position wherein the lowered position is located below the lifted position and closer to the main upright member of the carriage assembly.

It is an object of the tank handling apparatus of the present invention to provide a means for lifting, supporting and manipulating of a cylindrical tank such as oxygen tanks which provides a deployable foot supporting member which is maintained in a supporting foot position unless the user operates a deployment handle which is operationally secured to the foot supporting member to facilitate retraction thereof from the supporting foot position to the retracted foot position.

It is an object of the tank handling apparatus of the present invention to provide a means for lifting, supporting and manipulating of a cylindrical tank such as oxygen tanks which includes a foot locking mechanism which includes a locking lug movable between a lug locking position and a lug unlocking position which is operable to lock a foot supporting member in the deployed position as needed for the purposes of safety.

It is an object of the tank handling apparatus of the present invention to provide a means for lifting, supporting and manipulating of a cylindrical tank such as oxygen tanks to be of minimal capital costs.

It is an object of the tank handling apparatus of the present invention to provide a means for lifting, supporting and manipulating of a cylindrical tank such as oxygen tanks to have minimal maintenance requirements.

It is an object of the tank handling apparatus of the present invention to provide a means for lifting, supporting and manipulating of a cylindrical tank such as oxygen tanks to be completely portable from one location to another due to the lightweight nature and inclusion of the carriage assembly thereof which can be serviced by technicians without specific repairing or maintenance training.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which.

DETAILED DESCRIPTION OF THE PREFERRED EMBODIMENT

Figure 1:
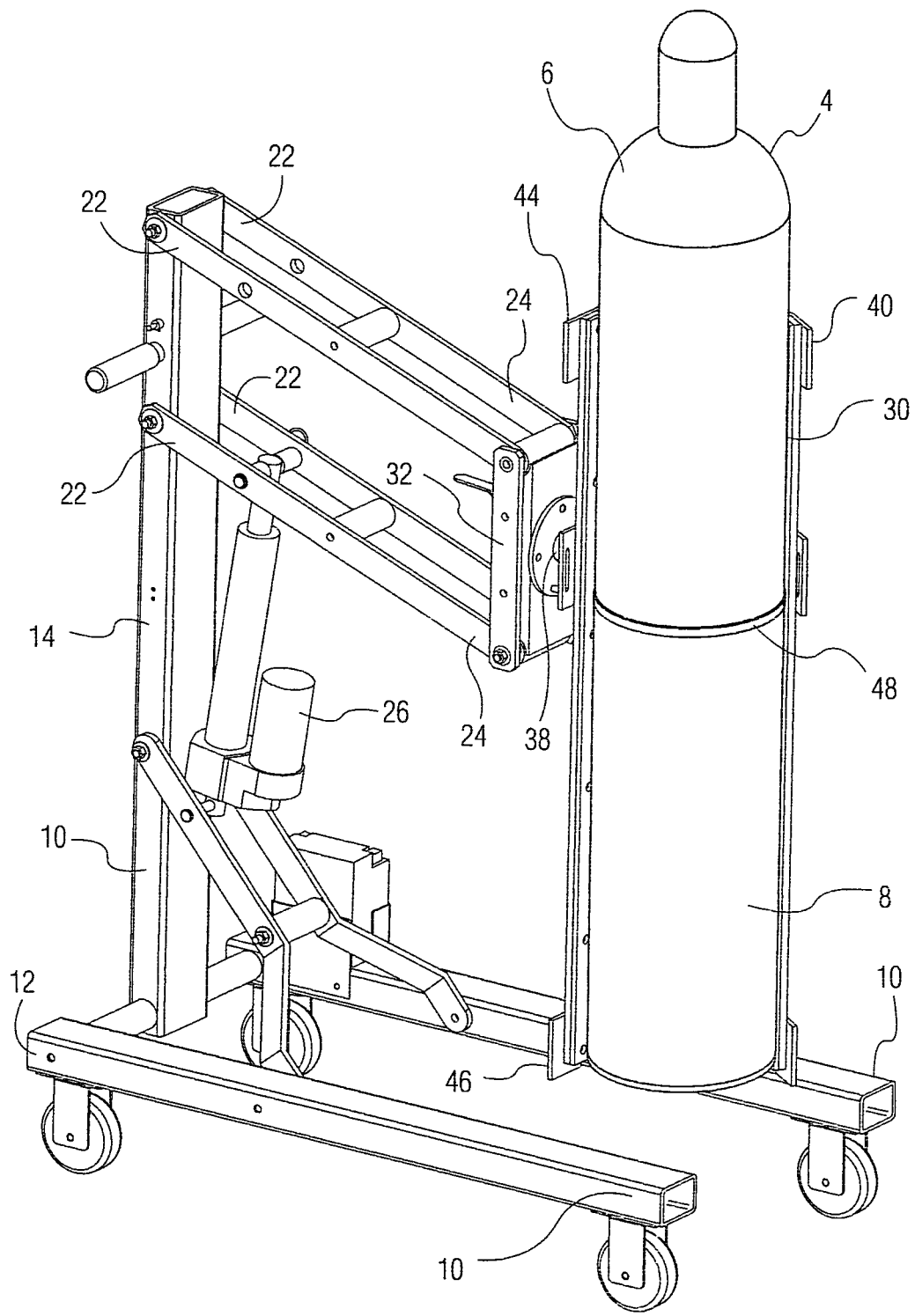
FIG. 1 shows an embodiment of a tank handling apparatus of the present invention for use lifting, supporting and manipulating a cylindrical tank in perspective which shows a cylindrical tank positioned vertically and the parallel swing arm assembly moved to the lowered position.
Figure 2:
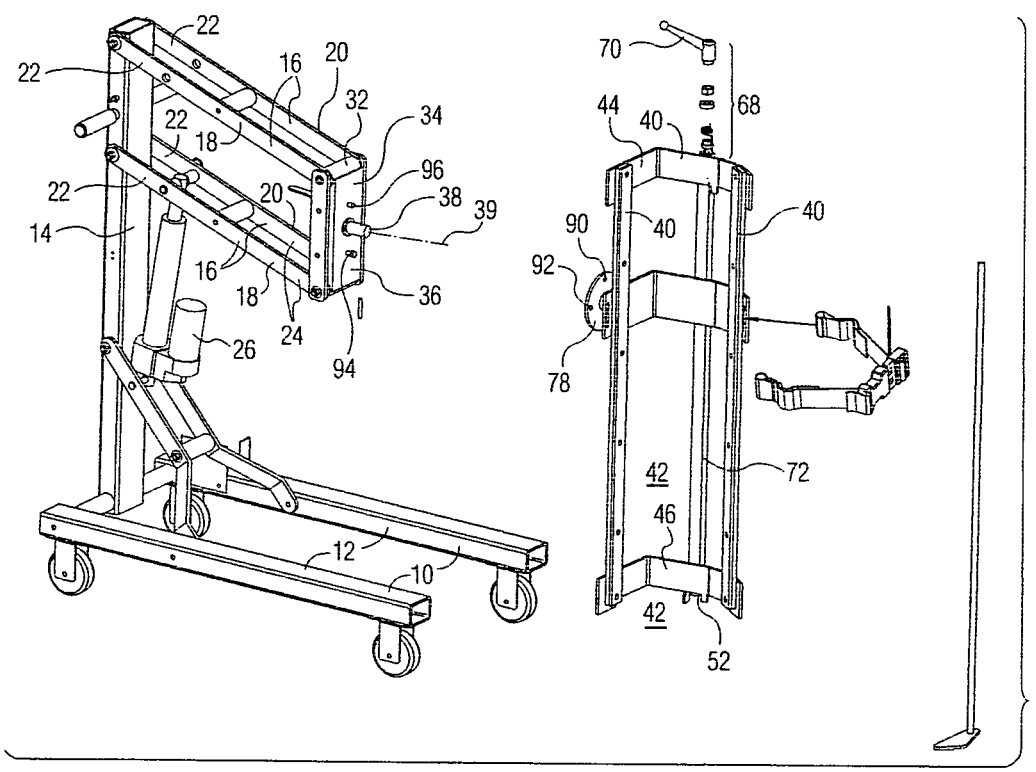
FIG. 2 is an exploded view of the configuration shown in FIG. 1 with the illustration of the tank itself removed and the tank holding section exploded for purposes of clarity.
Figure 3:
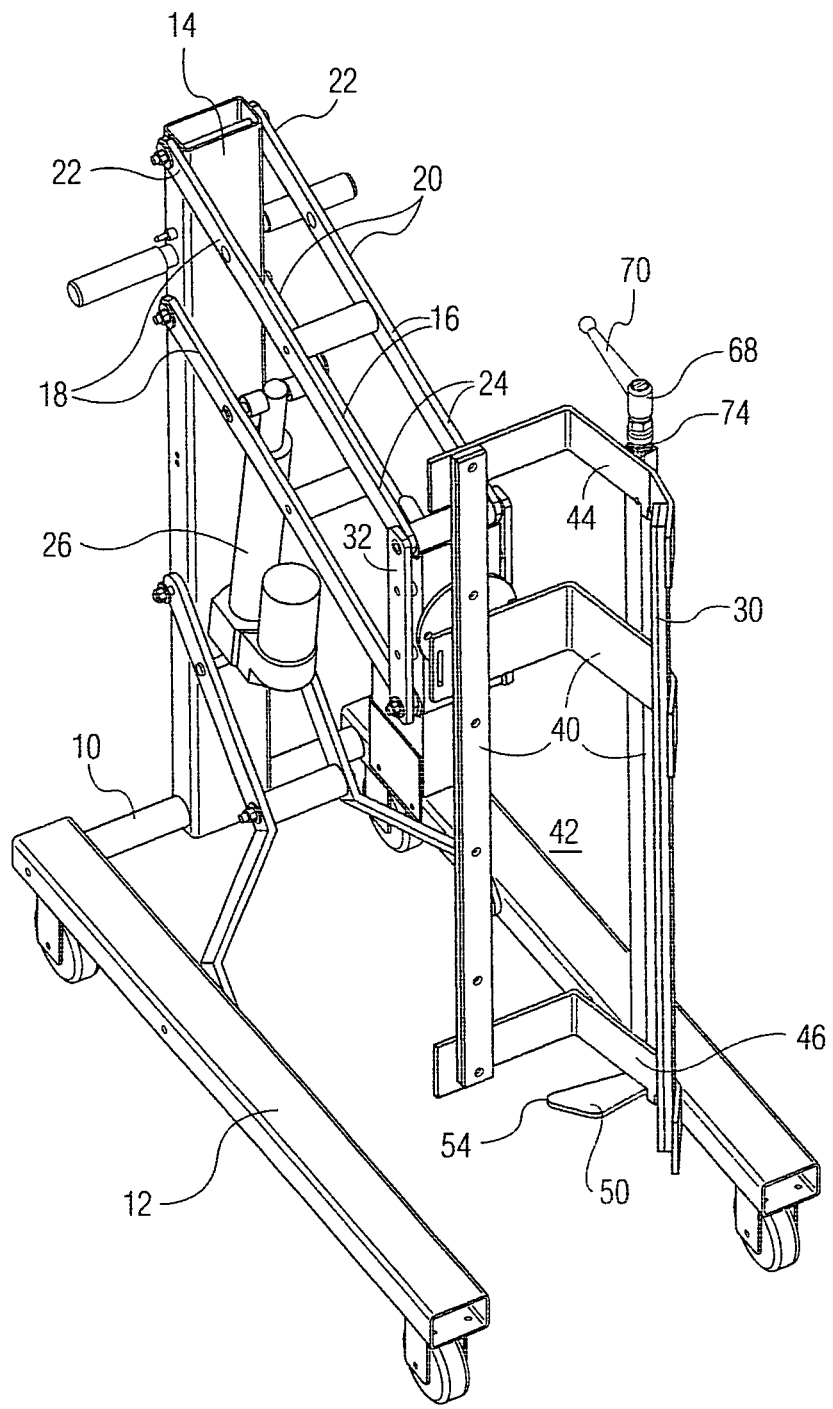
FIG. 3 is a front three-quarter perspective illustration of an embodiment of the configuration set forth in FIG. 1 shown from above with the parallel swing arm assembly in the lowered position and the foot supporting member in a fully deployed position and the tank retaining housing for holding a tank in a vertically extending position.
Figure 4:
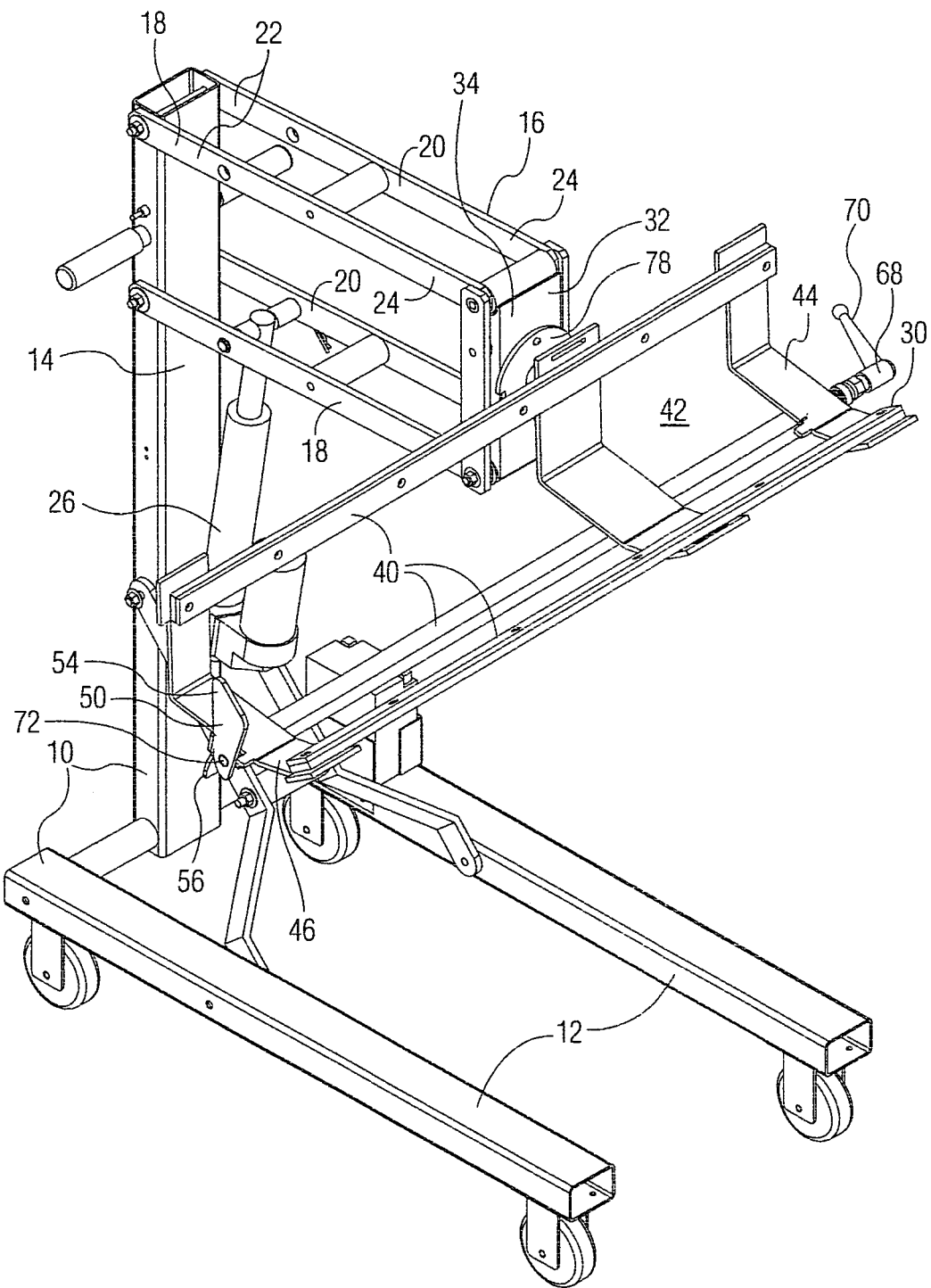
FIG. 4 is a front three-quarter perspective illustration of an embodiment of the configuration set forth in FIG. 1 shown from above with the parallel swing arm assembly in the lowered position and the foot supporting member in a fully deployed position and the tank retaining housing for holding a tank in a horizontally extending position.
Figure 5:
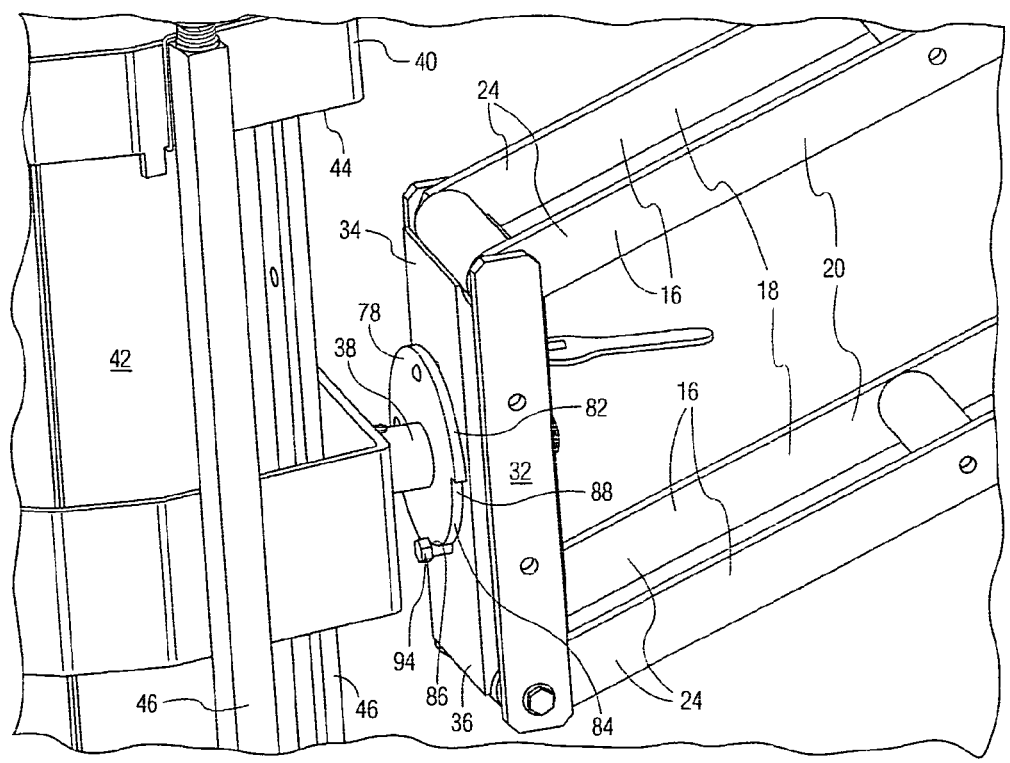
FIG. 5 is a close-up view of the area between the front rail assembly and the tank retaining housing which shows the cam member and surrounding apparatus positioned therebetween.
Figure 6:
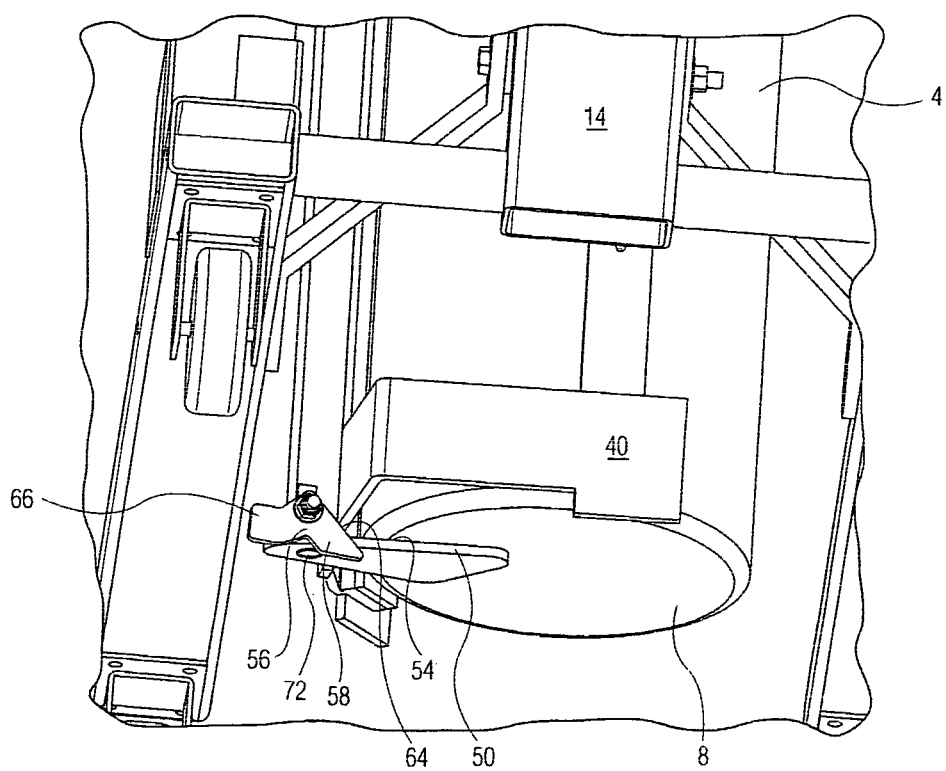
FIG. 6 is a rear perspective view of an embodiment of the lower housing section of the tank retaining housing which clearly illustrates the configuration of the foot locking mechanism with the locking lug thereof shown in the lug locking position with the foot supporting member fully deployed and locked in place.
Figure 7:
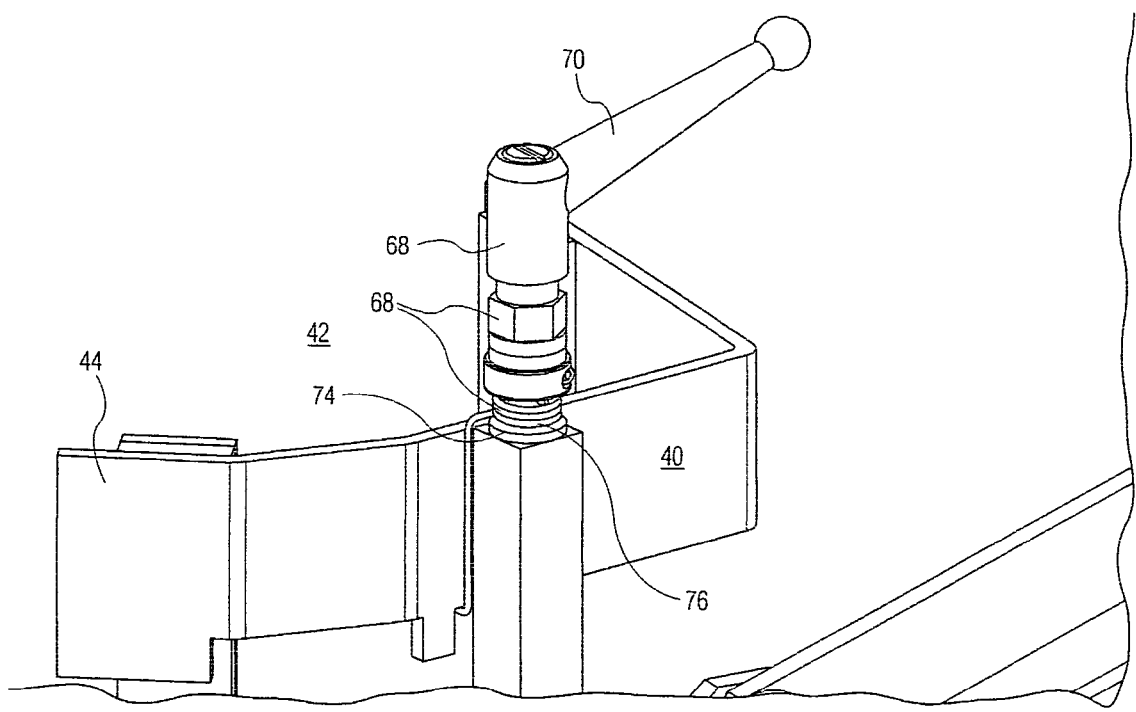
FIG. 7 is a close-up view of an embodiment of the deployment handle mechanism showing the continuous resilient biasing created by the resilient biasing means which in this figure is shown as a coil spring extending between the handle and the drive shaft.
Figure 8:
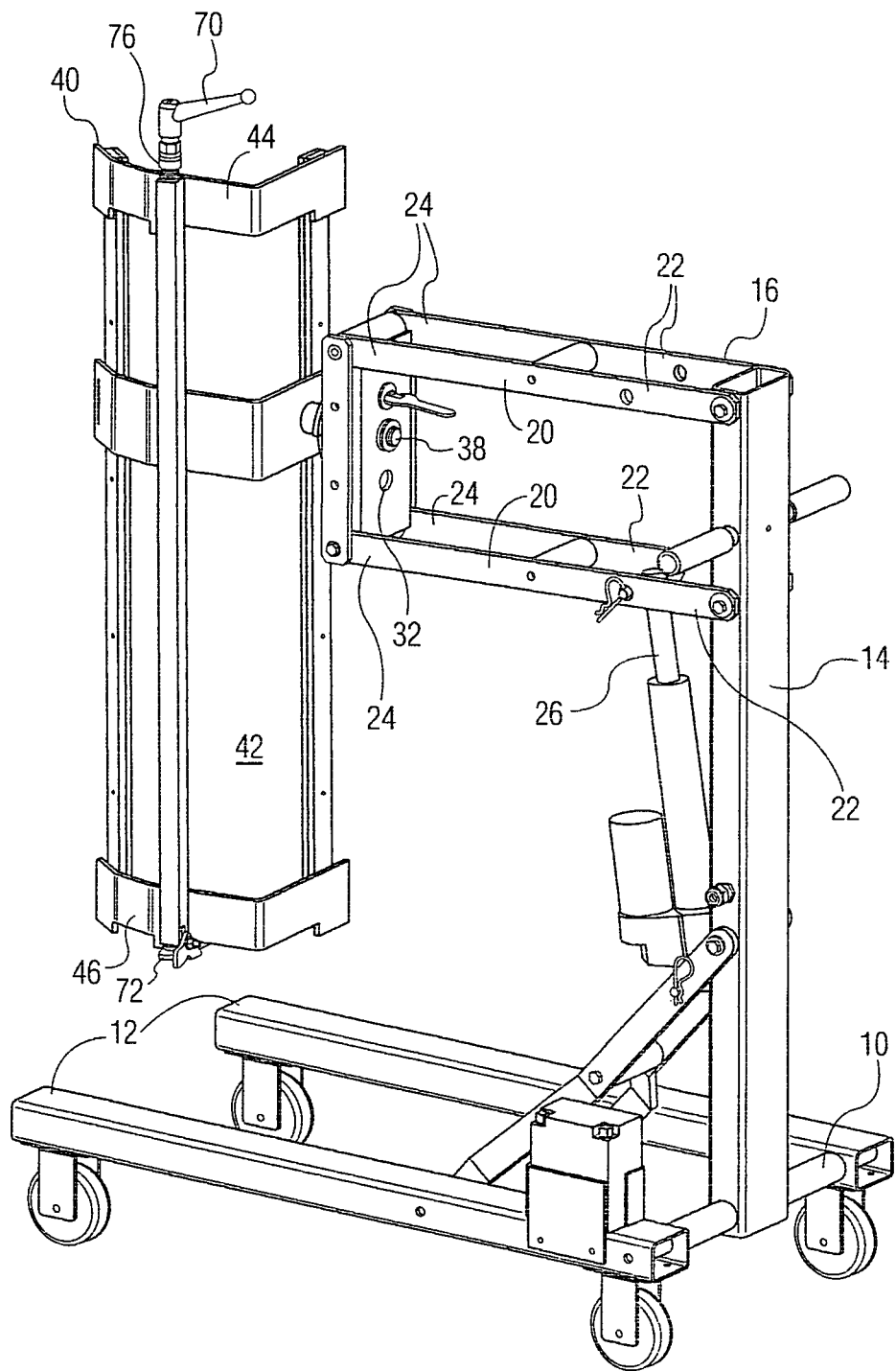
FIG. 8 is a rear perspective view of an embodiment of the tank handling apparatus of the present invention shown with the tank removed for clarity and the tank retaining housing oriented vertically.
Figure 9:
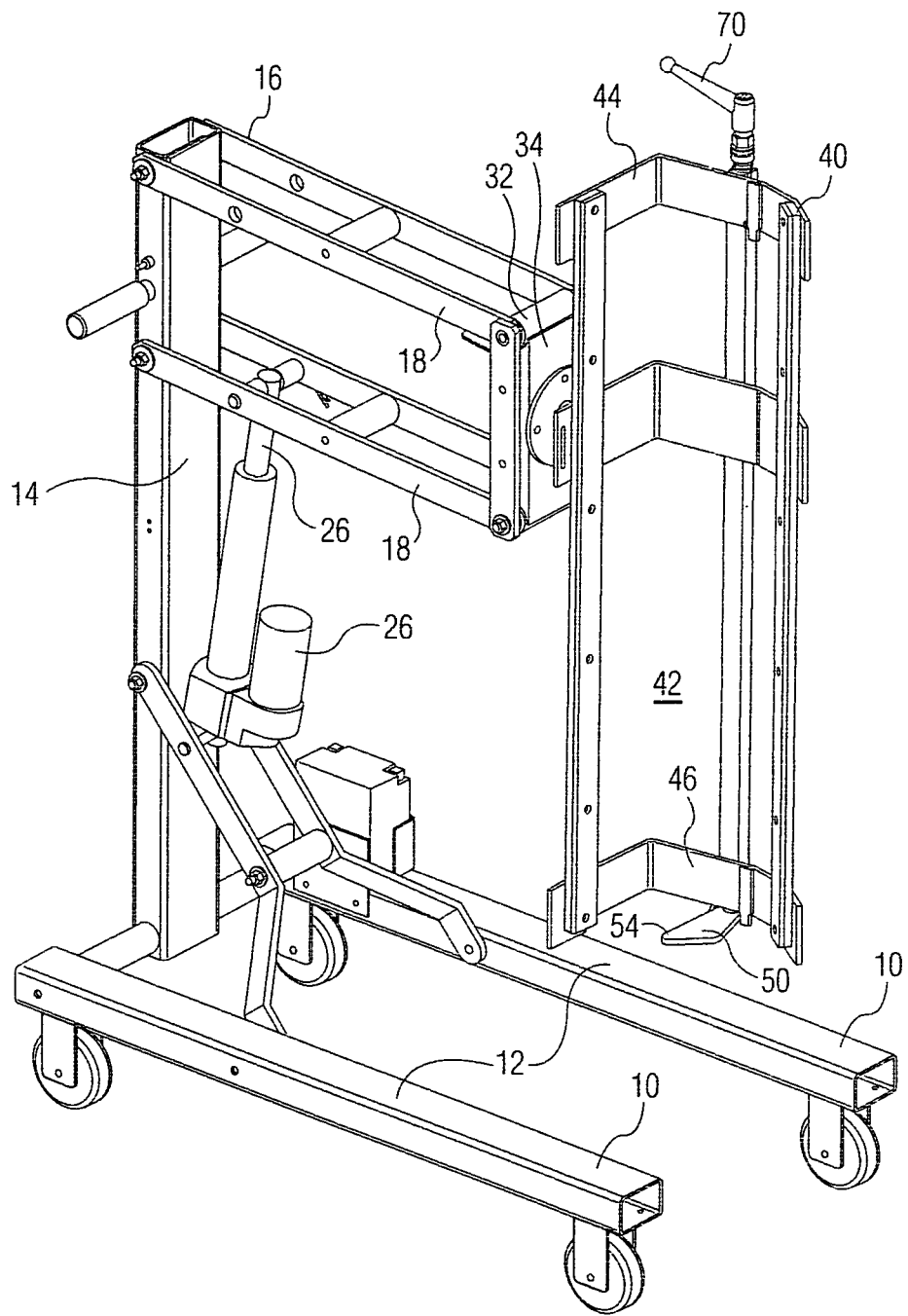
FIG. 9 is a front perspective view of the embodiment shown in FIG. 8.
Figure 10:
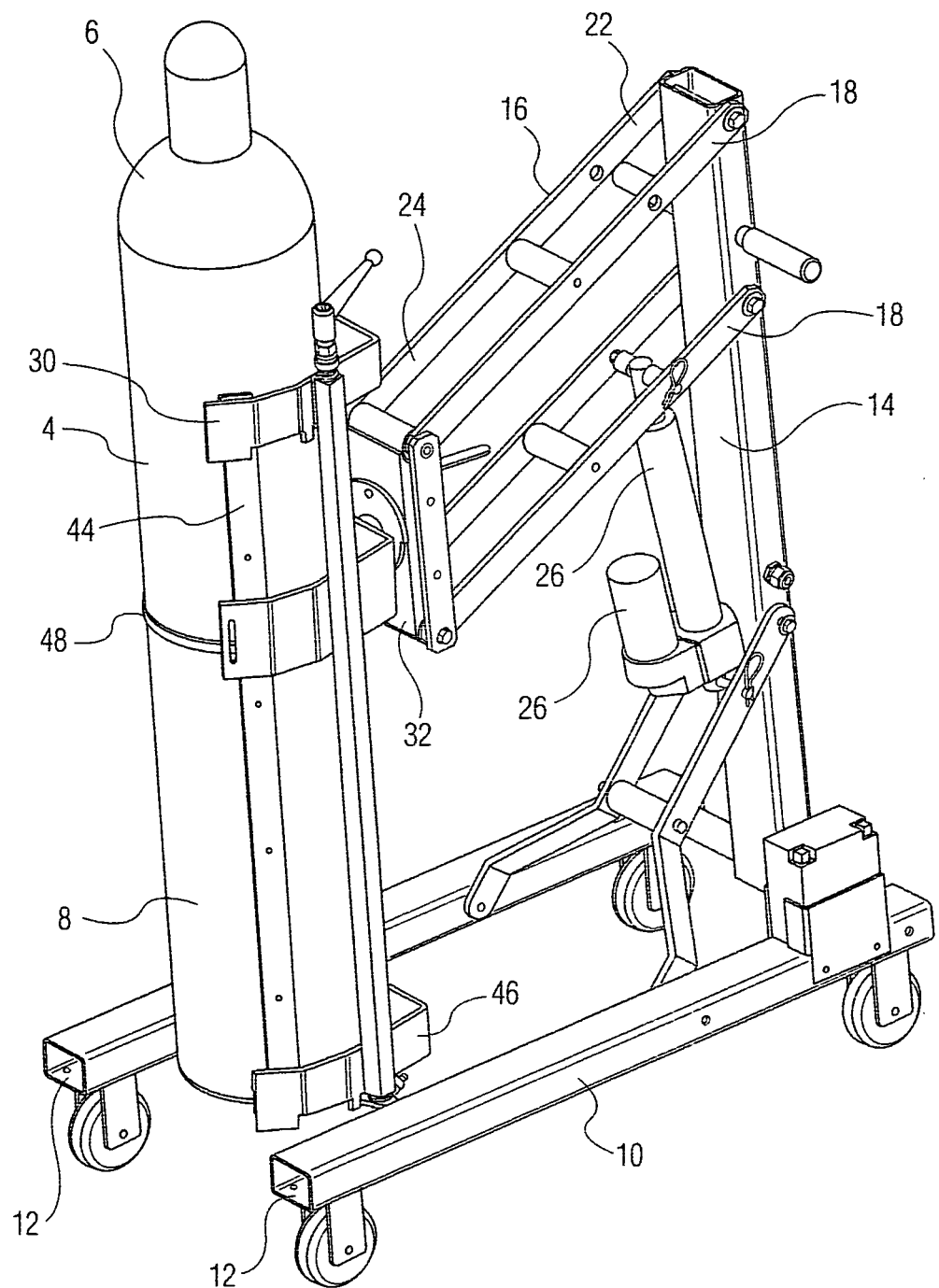
FIG. 10 is a rear perspective illustration of a configuration of the tank handling apparatus of the present invention with a cylindrical tank shown in position retained within the tank retaining housing and with the parallel swing arm assembly in the lowered position.
Figure 11:
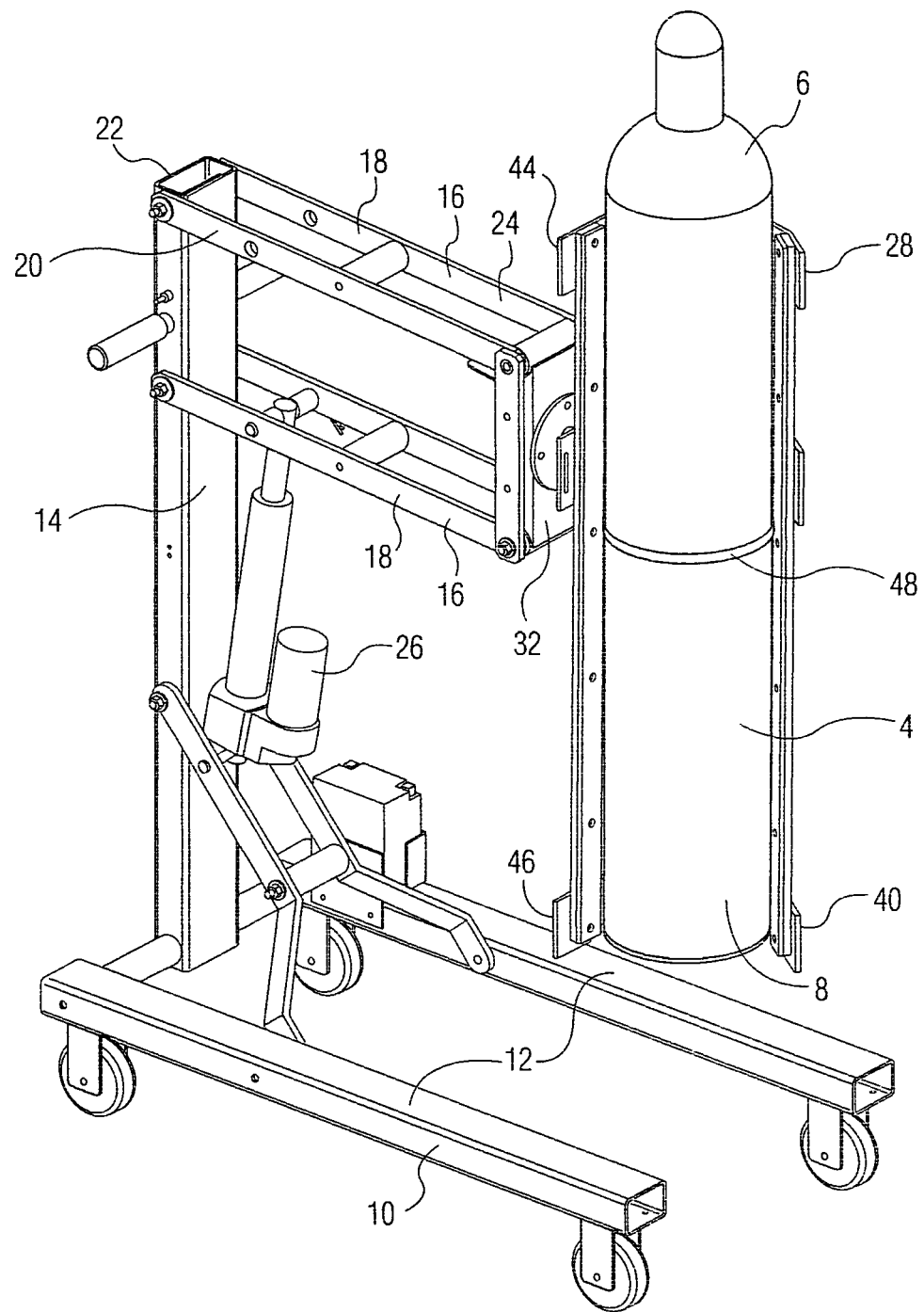
FIG. 11 is a front perspective view of the embodiment shown in FIG. 10 with the parallel swing arm assembly located in the lifted position.
Figure 12:
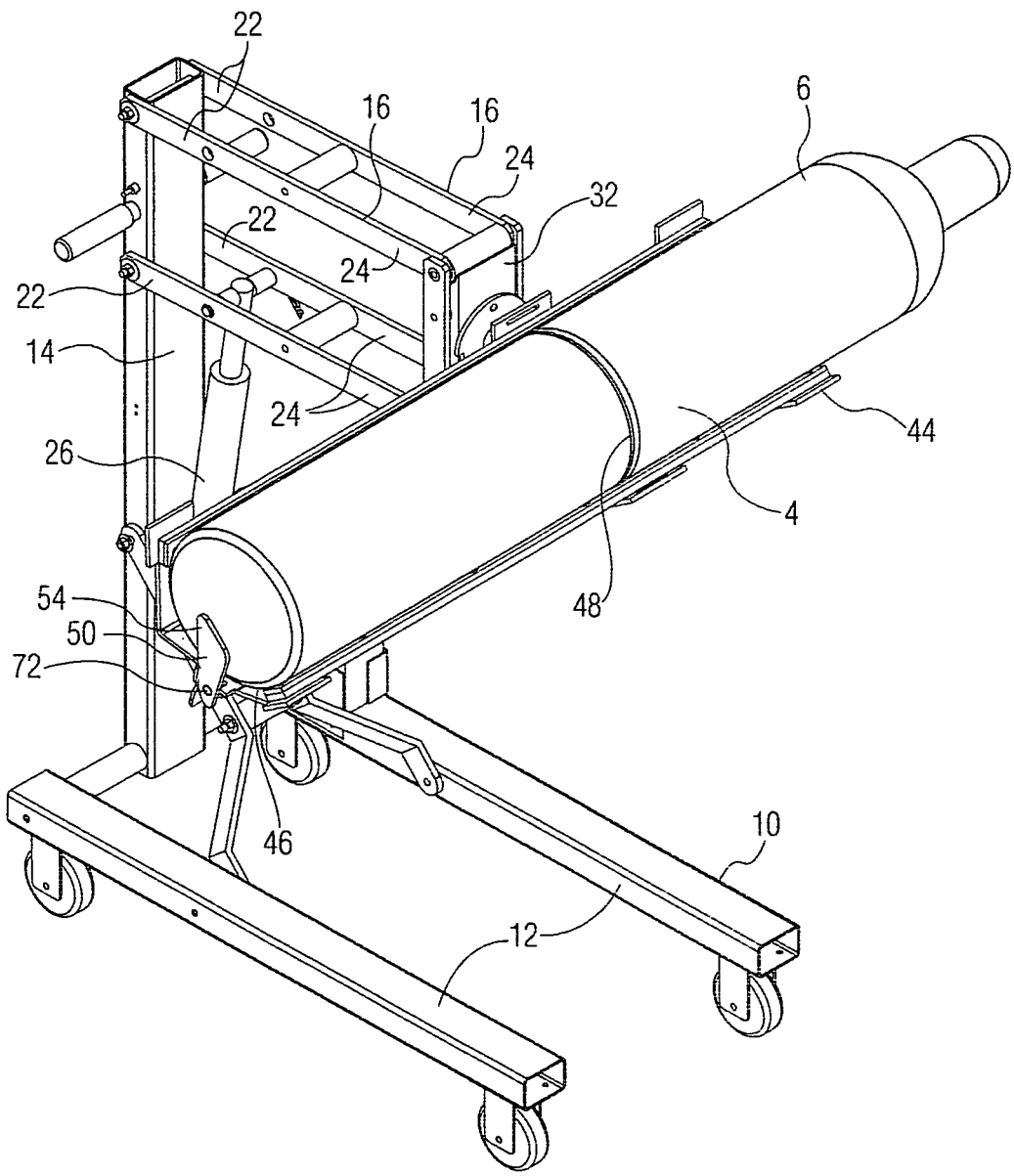
FIG. 12 is a top three-quarter perspective view of an embodiment of the present invention showing a cylindrical tank retained within the tank receiving zone of the tank retaining housing oriented in a horizontally extending direction.
Figure 13:
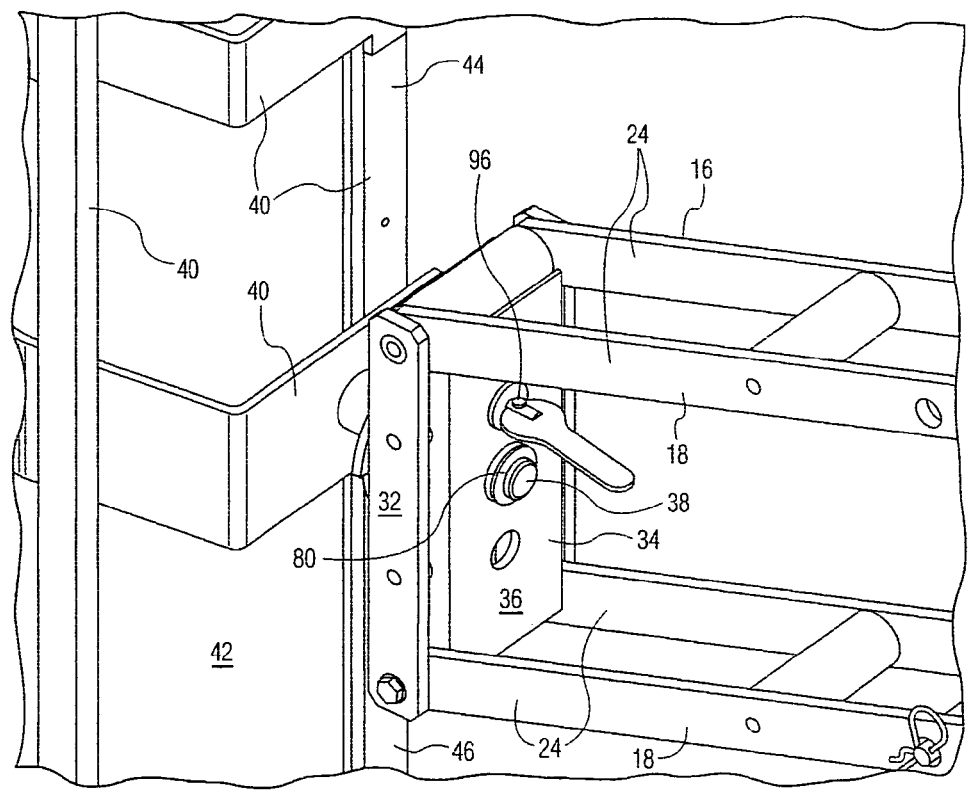
FIG. 13 is a close-up perspective view of a rear portion of the tank handling apparatus of the present invention showing the interface between the tank retaining housing and the front rail assembly.
Figure 14:
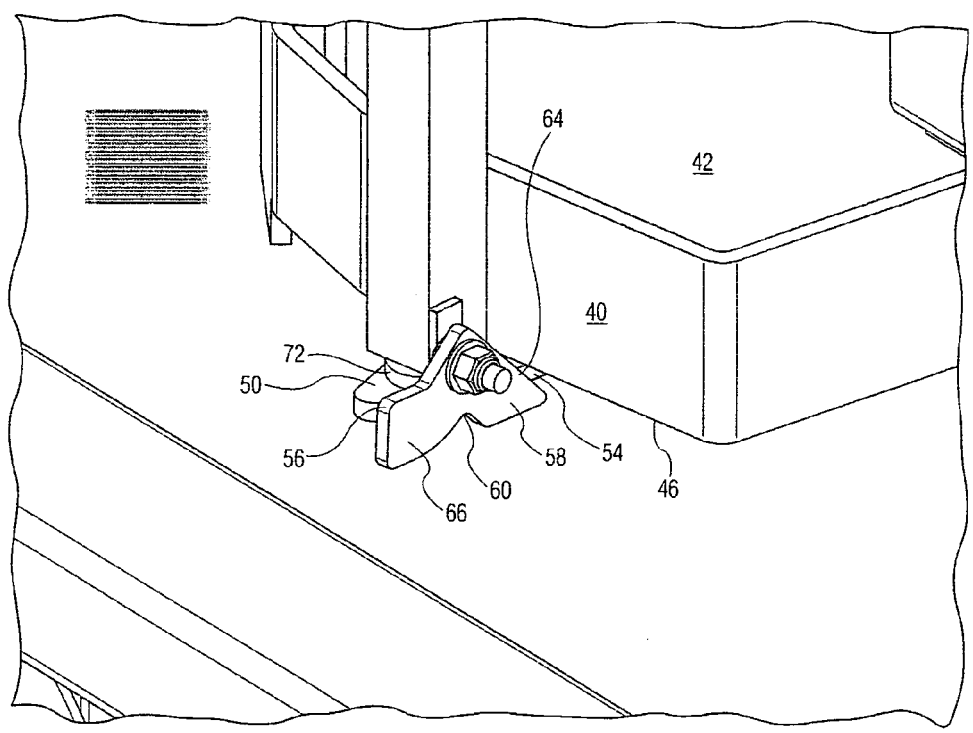
FIG. 14 is a close-up perspective illustration of an embodiment of the lower housing section of the tank retaining housing of the present invention showing the foot locking means wherein the locking lug is positioned in the lug locking position retaining the supporting foot in the foot supporting position.
Figure 15:
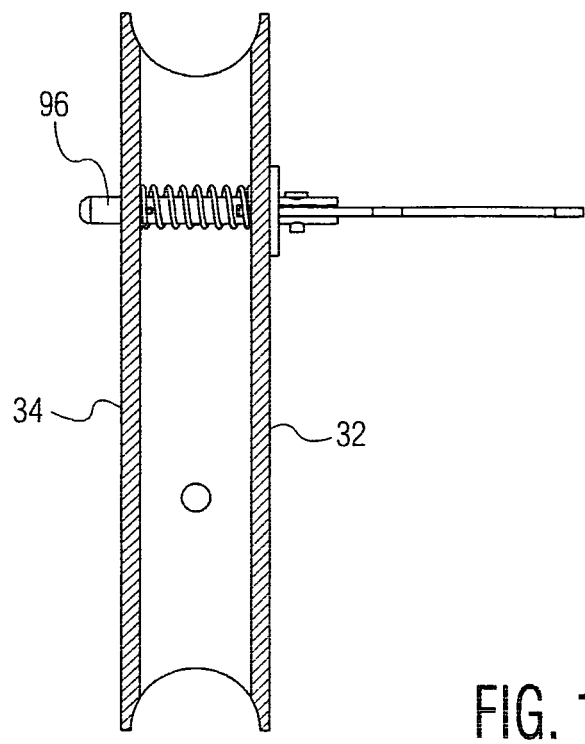
FIG. 15 is a cross-sectional view of an embodiment of the front rail assembly and particularly the face plate thereof with the locking pin extending therethrough and resiliently biased by a coil spring.
Figure 16:
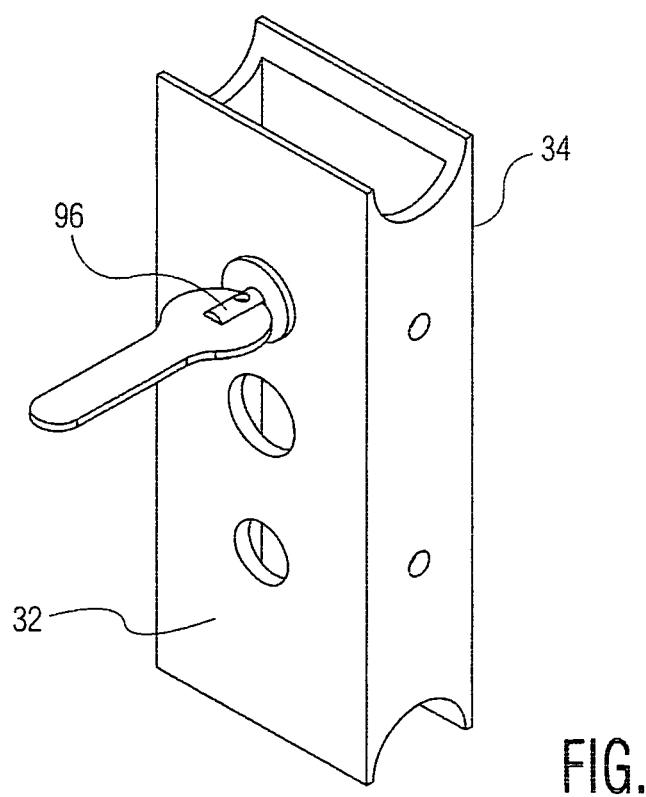
FIG. 16 is a perspective side view of the configuration shown in FIG. 15.
Figure 17:
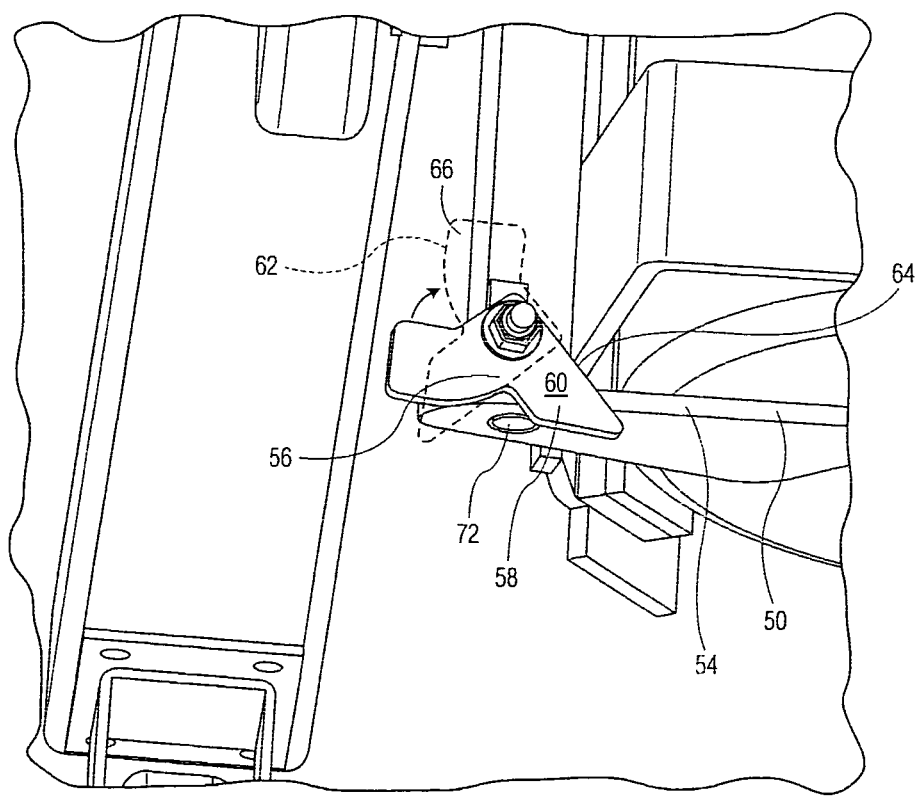
FIG. 17 is a close-up perspective view similar to FIG. 14 which for clarity shows the two possible positions for the locking lug of the foot locking means, namely, the lug locking position and the lug unlocking position.
Figure 18:
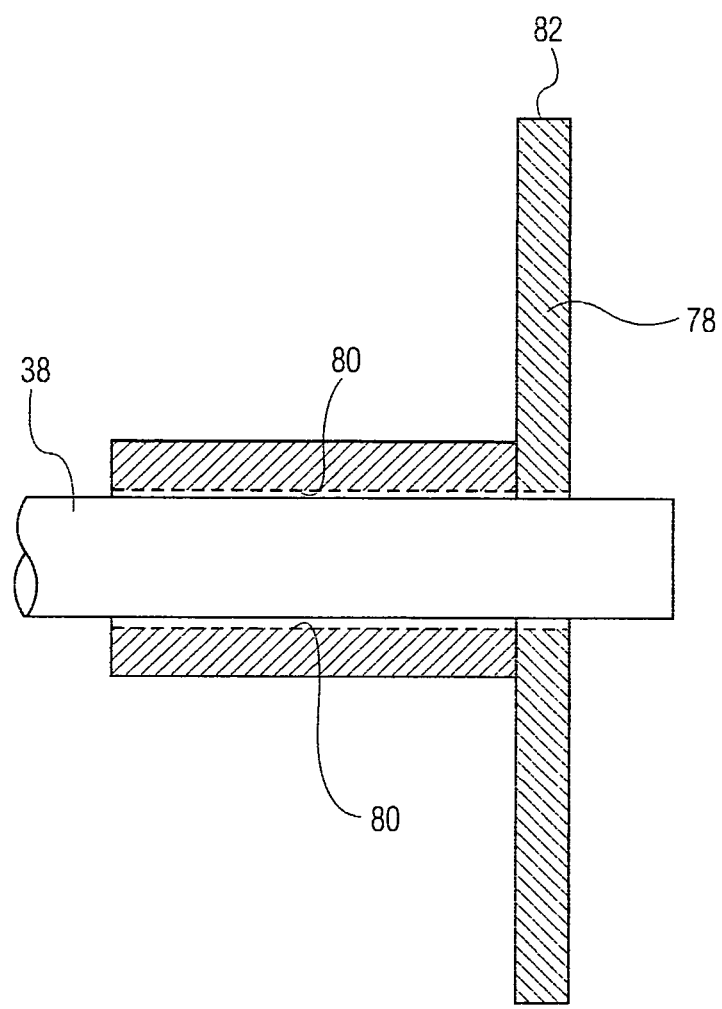
FIG. 18 is a cross-sectional view of an embodiment of the present invention showing the interaction between the main shaft as it extends through the cam bore with the cam member and peripheral cam edge extending therearound for maintaining operative movability between the tank retaining housing and the front rail assembly.

The construction of the tank handling apparatus of the present invention is designed specifically to aid in the lifting, supporting and manipulating of a cylindrical tank 4. Such a tank normally includes an upper tank section 6 which includes an opening for access to the interior portion of the tank and may include various different configurations of a valve thereadjacent. The cylindrical tank 4 will preferably also include a lower tank section 8 positioned therebelow including a bottom of the lower tank which provides a bottom for the entire tank and needs to be supporting during certain orientations and movements of the tank.

The tank handling apparatus preferably includes a carriage assembly 10 including a transport frame 12 which preferably includes a plurality of wheels to facilitate movement of the carriage assembly 10 and relocation of the tank handling apparatus to enhance portability thereof. A main upright member 14 is included in the carriage assembly secured to the transport frame 12 and extending generally vertically upwardly therefrom.

A parallel swing arm assembly 16 is pivotally mounted with respect to the main upright member 14 of the carriage assembly 10 and extends outwardly therefrom. The parallel swing arm assembly 16 includes a supporting end 22 pivotally attached with respect to the main upright member 14 of the carriage assembly 10. Parallel swing arm assembly 16 also includes a tank end 24 spatially disposed from the supporting end 22.

The apparatus further includes a driving device 26 which is preferably longitudinally extendible and retractable and is attached to the carriage assembly 10, as well as being attached with respect to the parallel swing arm assembly 16 and extending between drive 26 and assembly 16. The assembly 16 is movable to a lifted position 28 responsive to extending movement of the drive 26. The parallel swing arm assembly 16 is also movable to a lower position 30, selectively, responsive to retracting movement of the drive means 26. This lower position 30 is defined to be located below the lifted position 28, as well as being closer to the main upright member than the lifted position 28.

The apparatus further includes a front rail assembly 32 which includes a face plate 34 pivotally attached to the tank end 24 of the parallel swing arm assembly 16 in order to be movable therewith. This face plate 34 will define a support surface 36 thereon which faces outwardly away from the main upright member 14. Front rail assembly 32 also includes a main shaft 38 extending outwardly from the face plate 34.

The handling apparatus further includes a tank retaining housing 40 pivotally attached to the face plate 34 of the parallel swing arm assembly 16 such as to be rotatable with respect thereto. This rotatable movement of the tank retaining housing 40 will extend through a plane oriented extending approximately parallel with respect to the support surface 36. The tank retaining housing 40 will further define a tank receiving zone 42 therealong which is adapted to selectively receive and hold a cylindrical tank therein.

The configuration of the tank retaining housing 40 will include an upper housing section 46 for the purpose of retaining the upper portion of a cylindrical tank 4 therein whenever the cylindrical tank 4 is located in position within the tank receiving zone 42. Furthermore, the tank retaining housing 40 will include a lower housing section 44 for the purpose of holding the lower portion of the cylindrical tank 4 therein whenever the cylindrical tank 4 is positioned in the tank receiving zone 42. Furthermore, a securement mechanism 48 will be included which is adapted to surround and engage the cylindrical tank 4 for selectively securing thereof with respect to the tank retaining housing 40 at a position within the tank retaining zone 42 with the lower portion thereof positioned within the lower housing section 44 and the upper portion thereof positioned within the upper housing section 46.

The apparatus of the present invention further includes a foot supporting member 50 which is movably mounted relative to the lower housing section 44 of the tank retaining housing 40. This foot supporting member 50 is selectively movable to a retracted foot position 52 located spatially disposed from a cylindrical tank 4 when positioned within the tank receiving zone 42. Additionally, the foot supporting member 50 is also movable to a foot supporting position 54 located adjacent to the lower tank section 8 of a cylindrical tank 4 when it is positioned in the tank receiving zone 42, in order to selectively facilitate supporting of the lower section of a tank by positioning of the foot supporting member 50 immediately below the bottom of the tank selectively. In the preferred configuration of the present invention, this foot supporting member 50 is resiliently biased at all times tending to urge movement thereof toward the supporting foot position 54.

A deployment handle mechanism 68 will be included mounted to the tank retaining housing 40 which is operatively attached with respect to the foot supporting member 50 in such a manner that it provides a capability for applying force on the foot supporting member 50 to urge movement thereof toward the retracted position 52 by overcoming the continuous biasing of the foot supporting member 50 toward the supporting foot position 54.

This deployment handle mechanism 68 is preferably powered by manual manipulation thereof, and when sufficient manual force is applied to the deployment handle mechanism 68, it will overpower the continuous biasing means above described and urge movement of the foot supporting member 50 to the retracted foot position 52.

Also included with the configuration shown in the present invention, will be a foot locking means 56 movably mounted with respect to the tank retaining housing 40 which includes a locking lug 58 pivotally movably mounted with respect to the lower housing section 44 of the tank retaining housing 40. This mounting will be made preferably at a position adjacent to the foot supporting member 50. The configuration of the locking lug 58 is such that it is movable to a lug locking position 60 for the purpose of selectively holding the foot member 50 in the supporting foot position 54 responsive to the rotational movement of the tank retaining housing 40 to a position where the cylindrical tank 4 is already in a generally and vertically extending direction. The locking lug 58 is also movable to a lug locking position 60 for the purpose of selectively holding the foot supporting member 50 in the supporting foot position 54 responsive to rotational movement of the tank retaining housing 40 to a position wherein the cylindrical tank 4 is oriented extending vertically. The locking lug 58 is also configured such as to be movable to a lug unlocking position 62 which selectively allows movement of the foot supporting member 50 away from the supporting foot position 54 and toward the retracted foot position 52. This movement is caused by operation of the deployment handle mechanism 68 and is responsive to rotational movement of the tank retaining housing 40 to a position wherein the cylindrical tank 4 is oriented extending generally horizontally. Movement of the locking lug 58 of the foot locking device 56 between the lug locking position 60 and the lug unlocking position 62 is powered solely by the exertion of gravitational forces thereon which are responsive to movement of the tank retaining housing where the cylindrical tank 4 is positioned therein between a generally horizontally extending orientation and a generally vertically extending orientation.

The configuration of the foot locking mechanism 56 of the present invention includes a locking abutment surface 64 thereon which is positionable in abutment with respect to the lower housing section 44 of the tank retaining housing 40 responsive to movement of the locking lug 58 of the foot locking means 56 into the lug locking position 60.

The foot locking means 56 of the present invention can also include a weighted locking section 66 which is responsive solely to gravitational force exerted thereupon to further facilitate movement of the locking lug 58 between the lug locking position 60 and the lug unlocking position 62. Furthermore, the lower housing section 44 of the tank retaining housing 40 will preferably be heavier than the upper housing section 46 of the tank retaining housing 40 where the cylindrical tank 4 positioned within the zone 42 in order to facilitate rotational movement of the tank retaining housing 40 to a generally vertically extending orientation with the upper housing section 46 positioned above the lower housing section 44.

The parallel swing arm assembly 16 of the present invention is preferably formed with one or more first lifting arms 18 and one or more second lifting arms 20. This parallel swing arm assembly 16 is operative to move between the lifted position 28 and the lowered position 30 wherein the lower position 30 is positioned closer to the main upright member 14 of the carriage assembly 10, than the spacing between the lifted position 28 and the main upright member 14.

The configuration of the deployment handle mechanism 68 of the present invention preferably includes a handle 70 for deployment, also referenced as the deployment handle, which is pivotally movably mounted with respect to the tank retaining housing 40. This deployment handle mechanism 68 will also include a handle driveshaft 72 which is rotatably mounted with respect to the tank retaining housing 40 and can extend from a position adjacent the deployment handle 70 to a position adjacent the foot supporting member 50. This handle driveshaft 72 is preferably operatively attached with respect to the foot supporting member 50 and to the deployment handle 70 in order to be capable of applying force on the foot supporting member 50 in order to urge movement thereof toward the retracted foot position 52 responsive to manual operation of the deployment handle 70.

The deployment handle mechanism 68 will preferably further include a
resilient biasing means 74 operatively secured with respect to the deployment handle 70 and with respect to the driveshaft 72. The resilient biasing means 74 will be operative to apply force on the foot supporting member 50 for the purpose of urging movement thereof toward the supporting foot position 54 preferably in a continuous fashion. Preferably this resilient biasing means 74 will comprise a coil spring means 76 which is wound around the driveshaft and is operatively secured to the driveshaft, as well as to the deployment handle 70 directly.

The apparatus of the present invention includes a unique configuration for the front rail assembly 32 since it preferably includes this main shaft 38 extending outwardly from the face plate 34. The tank retaining housing 40 will preferably include a cam member 78 which defines preferably a cam bore 80 extending therethrough. The main shaft 38 is positioned preferably extending into the cam bore 80 to facilitate rotational movement of the tank retaining housing 40 with respect to the front rail assembly 32 in a plane extending generally parallel with respect to the face plate 34 of front rail assembly 32.

Preferably the configuration of the main shaft 38 will define a main shaft axis 39 extending axially therealong. The tank retaining housing 40 will preferably be oriented such that it is rotationally movable with respect to the face plate 34 through a plane oriented extending approximately perpendicularly with respect to the main shaft axis 39.

The configuration of the front rail assembly 32 will be configured such that it preferably includes a guide pin 94 extending outwardly therefrom. The cam member 78 will be defined to include a peripheral cam edge 82 extending therearound and a cam guide channel 84 defined along a portion or sector of the peripheral cam edge 82. The guide pin 94 will be positioned in abutment with respect to the cam guide channel 84 defined along the peripheral cam edge 82 in order to facilitate guiding of alignment between the tank retaining housing 40 and the front rail assembly 32 during relative rotational movement of the tank retaining housing 40 between a generally horizontally extending position, and a generally vertically extending position thereof.

With this configuration, the cam guide channel 84 will include a first channel end 86 and a second channel end 88. The first channel end 86 will be capable of being positioned in abutment with respect to the guide pin 94 responsive to positioning of the tank retaining housing 40 in a generally horizontally oriented direction. The second channel end 88 is positionable in abutment with respect to the guide pin 94 responsive to the tank retaining housing 40 extending in the generally vertically extending orientation. Cam member 78 will define a first locking aperture 90 and a second locking aperture 92 therein. The front retaining housing will include a locking pin 96 therein which extends outwardly therefrom. This locking pin 96 will be adapted to extend into and engage with the first locking aperture 90 responsive to positioning of the tank retaining housing 40 in a generally horizontally extending position. Also, the locking pin 96 will be adapted to extend into and engage with the second locking aperture 92 responsive to positioning of the tank retaining housing 40 in a generally vertically extending position.

In the preferred configuration of the present invention, the main shaft axis 39 will be positioned normal with respect to the face plate 34 of the front rail assembly 32.

With the configuration shown in the drawings of the present invention, the peripheral cam edge 82 will preferably be arcuate or shaped approximately circularly. Also, the cam guide channel 84 will be arcuate. To enhance the configuration, the deployment handle 70 will preferably be manually operable for the purpose of selectively urging movement of the foot supporting member 50 toward the supporting foot position 54. This supporting foot position 54 will preferably be located immediately below and adjacent to the lower housing section 44 of the tank receiving zone 42.

In this manner, the above-identified invention provides a novel and unique construction which is usable for carefully and accurately lifting, supporting, as well as, manipulating and otherwise handling a cylindrical tank, such as a compressed air tank, for aiding in storage thereof, as well as removal thereof, to make the cylindrical tank ready for usage. The tank can be raised and lowered, as well as rotated, and in this manner, can be automatically positioned without any required manual labor into a proper orientation for movement or handling as desired.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:

1. A tank handling apparatus for use lifting, supporting and manipulating a cylindrical tank which includes an upper tank section and a lower tank section positioned therebelow, comprising:
   (A.) a carriage assembly including:
      (1) a transport frame;
      (2) a main upright member secured to said transport frame and extending upwardly therefrom;
   (B.) a parallel swing arm assembly pivotally mounted with respect to said main upright member of said carriage assembly and extending outwardly therefrom, said parallel swing arm assembly including:
      (1) a supporting end pivotally attached with respect to said main upright member of said carriage assembly;
      (2) a tank end spatially disposed from said supporting end;
   (C.) a drive means being longitudinally extendible and retractable and being attached with respect to said carriage assembly and being attached with respect to said parallel swing arm assembly and extending therebetween, said parallel swing arm assembly being movable to a lifted position responsive to extending movement of said drive means, said parallel swing arm assembly being movable to a lowered position responsive to retracting movement of said drive means, said lowered position being located below said lifted position and closer to said main upright member than said lifted position;
   (D.) a front rail assembly comprising:
      (1) a face plate pivotally attached with respect to said tank end of said parallel swing arm assembly and movable therewith, said face plate defining a support surface thereon facing outwardly away from said main upright member;
      (2) a main shaft extending outwardly from said face plate;
   (E.) a tank retaining housing pivotably moveably attached with respect to said face plate of said parallel swing arm assembly and being rotatable with respect thereto through a plane oriented extending approximately parallel with respect to said support surface, said tank retaining housing defining a tank receiving zone which is adapted to selectively receive and retain said cylindrical tank therewithin, said tank retaining housing including;
      (1) an upper housing section for retaining the upper portion of said cylindrical tank therein responsive to positioning of the tank within said tank receiving zone;
      (2) a lower housing section for retaining the lower portion of said cylindrical tank therein responsive to positioning of the tank within said tank receiving zone;
      (3) a securement means for selectively retaining and holding said cylindrical tank within said tank receiving zone with the lower portion thereof positioned within said lower housing section and with the upper portion thereof positioned within said upper housing section;
   (F.) a foot supporting member movably mounted with respect to said lower housing section of said tank retaining housing, said foot supporting member being selectively moveable to a retracted foot position located spatially disposed from said cylindrical tank positioned within said tank receiving zone, said foot supporting member also being selectively moveable to a supporting foot position located adjacent to the lower tank section of said cylindrical tank positioned within said tank receiving zone to selectively facilitate supporting of the lower section thereof responsive to positioning of the cylindrical tank within said tank receiving zone with the lower tank section thereof positioned within said lower housing section, said foot supporting member being resiliently biased for urging thereto to move toward said supporting foot position;
   (G.) a deployment handle mechanism mounted with respect to said tank retaining housing and being operatively attached with respect to said foot supporting member wherein operation thereof applies force on said foot supporting member to urge movement thereof toward said retracted foot position; and
   (H.) a foot locking means moveably mounted with respect to said tank retaining housing and including a locking lug pivotally moveably mounted with respect to said lower housing section of said tank retaining housing at a position adjacent to said foot supporting member, said locking lug being movable to a lug locking position to selectively hold said foot supporting member in the supporting foot position responsive to rotational movement of said tank retaining housing to a position wherein the cylindrical tank is oriented extending generally vertically, said locking lug also being movable to a lug unlocking position to selectively allow movement of said foot supporting member away from the supporting foot position and toward the retracted foot position, by operation of said deployment handle mechanism, responsive to rotational movement of said tank retaining housing to a position wherein the cylindrical tank is oriented extending generally horizontally, movement of said locking lug of said foot locking means between the lug locking position and the lug unlocking position being powered solely by the exerting of gravitation force thereon responsive to movement of said tank retaining housing with said cylindrical tank positioned therein between a generally horizontally oriented position and a generally vertically oriented position.

2. The tank handling apparatus for use lifting, supporting and manipulating a cylindrical tank as defined in claim 1 wherein said foot locking means includes a locking abutment surface thereon which positionable in abutment with respect to said lower housing section of said tank retaining housing responsive to movement of said locking lug of said foot locking means into the lug locking position thereof.

3. The tank handling apparatus for use lifting, supporting and manipulating a cylindrical tank as defined in claim 1 wherein said foot locking means includes a weighted locking section which is responsive solely to gravitation forces exerted thereon to further facilitate movement of said locking lug between the lug locking position and the lug unlocking position.

4. The tank handling apparatus for use lifting, supporting and manipulating a cylindrical tank as defined in claim 1 wherein said lower housing section of said tank retaining housing is heavier than said upper housing section of said tank with said cylindrical tank positioned within said tank receiving zone to facilitate rotational movement of said tank retaining housing to a generally vertically extending orientation with said upper housing section positioned above said lower housing section.

5. The tank handling apparatus for use lifting, supporting and manipulating a cylindrical tank as defined in claim 1 wherein said parallel swing arm assembly is operative to move between said lifted position and said lowered position wherein said lowered position is positioned closer to said main upright member of said carriage assembly than said lifted position.

6. The tank handling apparatus for use lifting, supporting and manipulating a cylindrical tank as defined in claim 1 wherein said deployment handle mechanism includes:
   (A.) a deployment handle pivotally movably mounted with respect to said tank retaining housing; and
   (B.) a handle driveshaft rotatably moveably mounted with respect to said tank retaining house and extending from a position adjacent said deployment handle to a position adjacent said foot supporting member, said handle driveshaft being operatively attached to said foot supporting member and to said deployment handle to apply force on said foot supporting member to urge movement thereof toward said retracted foot position responsive to operation of said deployment handle.

7. The tank handling apparatus for use lifting, supporting and manipulating a cylindrical tank as defined in claim 6 further comprising a resilient biasing means operatively secured with respect to said deployment handle and with respect to said handle driveshaft, said resilient biasing means being operative to apply force on said foot supporting member to urge movement thereof toward said supporting foot position.

8. The tank handling apparatus for use lifting, supporting and manipulating a cylindrical tank as defined in claim 7 wherein said resilient biasing means comprises a coil spring means.

9. The tank handling apparatus for use lifting, supporting and manipulating a cylindrical tank as defined in claim 1 wherein said front rail assembly further comprises a main shaft extending outwardly from said face plate and wherein said tank retaining housing includes a cam member which defines a cam bore extending therethrough, said main shaft being positioned extending into said cam bore to facilitate rotational movement of said tank retaining housing with respect to said front rail assembly in a plane extending generally parallel with respect to said face plate of said front rail assembly.

10. The tank handling apparatus for use lifting, supporting and manipulating a cylindrical tank as defined in claim 9 wherein said main shaft defines a main shaft axis extending axially therealong and wherein said tank retaining housing is rotationally moveable with respect to said face plate through a plane oriented extending perpendicularly with respect to said main shaft axis.

11. The tank handling apparatus for use lifting, supporting and manipulating a cylindrical tank as defined in claim 9 wherein said front rail assembly includes a guide pin extending outwardly therefrom and wherein said cam member includes a peripheral cam edge extending therearound and a cam guide channel defined along said peripheral cam edge, said guide pin being positioned in abutment with respect to said cam guide channel defined along said peripheral cam edge to facilitate guiding of alignment between said tank retaining housing and said front rail assembly during relative rotational movement of said tank retaining housing between a generally horizontally extending position and a generally vertically extending position.

12. The tank handling apparatus for use lifting, supporting and manipulating a cylindrical tank as defined in claim 11 wherein said cam guide channel includes a first end and a second end and wherein said first end is positional in abutment with respect to said guide pin responsive to said tank retaining housing extending in a generally horizontally extending orientation and wherein said second end is positional in abutment with respect to said guide pin responsive to said tank retaining housing extending in a generally vertically extending orientation.

13. The tank handling apparatus for use lifting, supporting and manipulating a cylindrical tank as defined in claim 1 wherein said cam member defines a first locking aperture and a second locking aperture therein, and wherein said front retaining housing includes a locking pin extending outwardly therefrom, said locking pin being adapted to extend into and engage with said first locking aperture responsive to positioning of said tank retaining housing in a generally horizontally extending position, said locking pin being adapted to extend into and engage with said second locking aperture responsive to positioning of said tank retaining housing in a generally vertically extending position.

14. The tank handling apparatus for use lifting, supporting and manipulating a cylindrical tank as defined in claim 10 wherein said main shaft axis is normal with respect to said face plate of said front rail assembly.

15. The tank handling apparatus for use lifting, supporting and manipulating a cylindrical tank as defined in claim 11 wherein said peripheral cam edge is arcuate.

16. The tank handling apparatus for use lifting, supporting and manipulating a cylindrical tank as defined in claim 11 wherein said peripheral cam edge is shaped approximately circularly.

17. The tank handling apparatus for use lifting, supporting and manipulating a cylindrical tank as defined in claim 11 wherein said cam guide channel is arcuate.

18. The tank handling apparatus for use lifting, supporting and manipulating a cylindrical tank as defined in claim 1 wherein said face plate of said front rail assembly is oriented facing approximately horizontally when positioned in the lifted position and in the lowered position and during movement between these two positions.

* * * * *